(12) United States Patent
De Prins et al.

(10) Patent No.: US 10,360,804 B2
(45) Date of Patent: Jul. 23, 2019

(54) METHODS AND APPARATUS TO ESTABLISH OPTIMIZED HOLDING PATTERNS FOR AIRCRAFT

(71) Applicant: The Boeing Company, Chicago, IL (US)

(72) Inventors: Johan De Prins, Brussels (BE); Niek Willem Klein Koerkamp, Delft (NL); Bastian Figlar, Berlin (DE)

(73) Assignee: The Boeing Company, Chicago, IL (US)

( * ) Notice: Subject to any disclaimer, the term of this patent is extended or adjusted under 35 U.S.C. 154(b) by 69 days.

(21) Appl. No.: 15/428,990

(22) Filed: Feb. 9, 2017

(65) Prior Publication Data

US 2017/0301246 A1   Oct. 19, 2017

(30) Foreign Application Priority Data

Feb. 26, 2016   (EP) .................................. 16382080

(51) Int. Cl.
 *G08G 5/00* (2006.01)
 *G06Q 10/04* (2012.01)
(52) U.S. Cl.
 CPC ......... *G08G 5/0052* (2013.01); *G06Q 10/047* (2013.01); *G08G 5/0021* (2013.01); *G08G 5/0091* (2013.01); *G08G 5/0039* (2013.01)
(58) Field of Classification Search
 CPC .. G08G 5/0021; G08G 5/0052; G08G 5/0039; G08G 5/0091; G08G 5/0013; G08G 5/025; G08G 5/0047
 See application file for complete search history.

(56) References Cited

U.S. PATENT DOCUMENTS

| | | | | |
|---|---|---|---|---|
| 8,244,453 | B2* | 8/2012 | Lacombe | G08G 5/0065 |
| | | | | 244/76 R |
| 8,700,317 | B1* | 4/2014 | Wilder | G08G 5/0052 |
| | | | | 701/423 |
| 9,640,079 | B1* | 5/2017 | Moravek | G08G 5/0013 |
| 2003/0093219 | A1 | 5/2003 | Schultz et al. | |

(Continued)

FOREIGN PATENT DOCUMENTS

| | | | |
|---|---|---|---|
| EP | 2980774 | 2/2016 | |
| EP | 2980774 A1 * | 2/2016 | ............ B64D 37/12 |

OTHER PUBLICATIONS

European Patent Office, "Extended European Search Report," issued in connection with European Patent Application No. 16382080.6, dated Jul. 12, 2016, 4 pages.

(Continued)

*Primary Examiner* — Redhwan K Mawari
(74) *Attorney, Agent, or Firm* — Hanley, Flight & Zimmerman, LLC (57) ABSTRACT

Example methods and apparatus are described herein for establishing optimized holding patterns for aircraft. An example method includes generating, based on a cost function condition, a cost function with at least one holding pattern optimization parameter, applying an optimization routine to the cost function based on optimization conditions to obtain a value for the at least one holding pattern optimization parameter having a minimized cost, and obtaining an optimized holding pattern with the selected value for the at least one holding pattern optimization parameter.

20 Claims, 7 Drawing Sheets

(56) References Cited

U.S. PATENT DOCUMENTS

| | | | |
|---|---|---|---|
| 2013/0080043 A1* | 3/2013 | Ballin | G08G 5/0034 |
| | | | 701/120 |
| 2014/0257684 A1 | 9/2014 | Wilder et al. | |
| 2015/0079545 A1* | 3/2015 | Kurtz | G09B 9/08 |
| | | | 434/30 |
| 2016/0031565 A1 | 2/2016 | Mohan et al. | |
| 2016/0347473 A1* | 12/2016 | Khatwa | B60T 8/1703 |
| 2017/0301246 A1* | 10/2017 | De Prins | G08G 5/0091 |

OTHER PUBLICATIONS

European Patent Office, "Communication pursuant to Article 94(3) EPC," issued in connection with European Patent Application No. 16382080.6, dated Jul. 10, 2017, 6 pages.

European Patent Office, "Summons to Attend Oral Proceedings Pursuant to Rule 115(1) EPC," issued in connection with European Patent Application No. 16382080.6, dated Feb. 5, 2019, 9 pages.

\* cited by examiner

METHODS AND APPARATUS TO ESTABLISH OPTIMIZED HOLDING PATTERNS FOR AIRCRAFT

RELATED APPLICATION

This patent claims priority to European Patent Application No. 16382080.6, titled "Method and Electronic Device for Establishing Optimized Holding Patterns for Aircraft," and filed Feb. 26, 2016. European Patent Application No. 16382080.6 is hereby incorporated by reference in its entirety.

FIELD

The present disclosure relates to methods and apparatus to dynamically establish optimized holding patterns flown by aircraft to minimize fuel consumption and/or reduce the time required to be spent by an airplane in a holding maneuver.

BACKGROUND

Holding patterns are racetrack patterns applied in flight operations in various situations such as, for example:
  For delaying arriving traffic in congested airspace.
  In military aviation, tanker aircraft fly orbits to provide refueling services to other aircraft.
  Military Airborne Warning And Control System (AWACS) aircraft can fly orbits for providing surveillance, control and communication services during military operations.
  In case of a non-critical technical problem with an airplane without fuel dump capability, the flight will stay in a holding pattern until the aircraft weight drops below the maximum landing weight.
  For relaying TV signals from ground during, for example, cycling events.
  For observation missions above a certain area of interest (e.g. with unmanned aerial systems).

Known holding patterns applied in arrival operations are mostly fixed. Holding pattern parameters (such as location, orientation and shape of the holding circuit) are typically predefined and published on the arrival charts. Air traffic control normally imposes an altitude and airspeed to be followed by the aircraft without taking into account fuel efficiency. Therefore, aircraft fuel consumption in current holding patterns is not optimized. In other situations where the airplane must rapidly consume fuel to reach an allowed landing weight, holding time is also not minimized.

SUMMARY

An example method disclosed herein includes receiving a plurality of optimization conditions including aircraft data and at least one of real-time and forecast atmospheric conditions proximate a holding pattern location, receiving a cost function condition and receiving at least one holding pattern optimization parameter. The example method also includes generating, by executing an instruction with a processor, based on the cost function condition, a cost function with the at least one holding pattern optimization parameter, applying, by executing an instruction with the processor, an optimization routine to the cost function based on the optimization conditions to obtain a value for the at least one holding pattern optimization parameter having a minimized cost, and obtaining, by executing an instruction with the processor, an optimized holding pattern with the selected value for the at least one holding pattern optimization parameter.

An example apparatus disclosed herein includes a communication module to receive a plurality of optimization conditions, the optimization conditions including aircraft data and at least one of real-time and forecast atmospheric conditions proximate a holding pattern location, and an optimization module to receive a cost function condition and at least one holding pattern optimization parameter. The optimization module includes a cost function generator to generate, based on the cost function condition, a cost function with the at least one holding pattern optimization parameter. The optimization module also includes a cost function optimizer to apply an optimization routine to the cost function based on the optimization conditions to obtain a value for the at least one holding pattern optimization parameter having a minimized cost and obtain an optimized holding pattern with the selected value for the at least one holding pattern optimization parameter.

An example tangible machine readable storage medium disclosed herein includes instructions that, when executed, cause a machine to at least receive a plurality of optimization conditions including aircraft data and at least one of real-time and forecast atmospheric conditions proximate a holding pattern location, receive a cost function condition and receive at least one holding pattern optimization parameter. The instructions, when executed, also cause the machine to generate, based on the cost function condition, a cost function with the at least one holding pattern optimization parameter, apply an optimization routine to the cost function based on the optimization conditions to obtain a value for the at least one holding pattern optimization parameter having a minimized cost and obtain an optimized holding pattern with the selected value for the at least one holding pattern optimization parameter.

BRIEF DESCRIPTION OF THE DRAWINGS

A series of drawings which aid in better understanding the disclosed embodiments and that are expressly related with an embodiment, presented as a non-limiting example thereof, are very briefly described below.

DETAILED DESCRIPTION

Example methods and apparatus disclosed herein generate tailored, optimized holding patterns according to a cost function to achieve a specific purpose (e.g. minimize aircraft fuel consumption or minimize flight time to reach the maximum landing weight). The present disclosure refers to methods and apparatus for optimizing holding patterns according to predetermined criteria, such as fuel cost efficiency or minimum holding time. As the geometry of the holding patterns and the atmospheric conditions have a major influence on aircraft fuel consumption, significant fuel cost savings can be achieved when introducing optimized variable holding patterns in which variable atmospheric conditions are accounted for. Example methods enable minimizing the fuel cost during a holding maneuver, when an aircraft is following a holding pattern.

When imposing an aircraft to fly a holding circuit, an additional objective is established according to a cost function. Depending on each particular situation the objective may be, for example:

To minimize fuel consumption for the enforced required time to spend in the holding circuit.

To maximize fuel burn and, therefore, minimize time required to reach the maximum allowed landing weight, which may be useful when facing a non-critical technical problem, for example.

To maximize endurance, i.e. to maximize flight duration or minimize fuel consumption per time unit such that the airplane can stay airborne as long as possible in support of the mission of the aircraft, for example, airborne refueling or surveillance.

Aircraft fuel consumption when flying a holding pattern is primarily set by the aircraft state (mass, speed and altitude), shape of the pattern and current atmospheric conditions at the location of the holding pattern. Some example methods optimize one or more of these variables to construct holding patterns that best meet the established objective.

An example method to establishing optimized holding patterns for aircraft includes:

Receiving a plurality of optimization conditions including aircraft data (e.g. real-time aircraft mass and flight performance data) and at least one of real-time and forecast atmospheric conditions proximate a holding pattern location.

Receiving a cost function condition.

Receiving at least one holding pattern optimization parameter.

Generating, from the cost function condition, a cost function with at least one holding pattern optimization parameter.

Applying an optimization routine to the cost function considering the optimization conditions to obtain a value for at least one holding pattern optimization parameter having a minimized cost.

Obtaining an optimized holding pattern with the selected value for the at least one holding pattern optimization parameter.

In some examples, the method further includes communicating the optimized holding pattern to a flight management system of the aircraft to enable controlled flight of the aircraft following the selected optimized holding pattern.

The optimization conditions may include at least one airspace holding pattern constraint. The holding pattern optimization parameters may include at least one of: a location of the holding pattern, an altitude of the holding pattern, an orientation of the holding pattern, a shape of the holding pattern, a target speed for the holding pattern, or a combination thereof. The cost function condition may include any of the following: minimum fuel consumption, maximum fuel consumption, or maximum endurance.

Also disclosed herein are example apparatus, which may be implemented by an electronic device, for establishing optimized holding patterns for aircraft. The apparatus includes a communication module and an optimization module. The communication module is configured to receive a plurality of optimization conditions, the optimization conditions including aircraft data and at least one of real-time and forecast atmospheric conditions proximate a holding pattern location. The optimization module is configured to receive a cost function condition and at least one holding pattern optimization parameter.

In some examples, the optimization module includes a cost function generator and a cost function optimizer. The cost function generator is configured to generate, from the cost function condition, a cost function with at least one holding pattern optimization parameter. The cost function optimizer is configured to apply an optimization routine to the cost function considering the optimization conditions to obtain a value for the at least one holding pattern optimization parameter having a minimized cost and obtain an optimized holding pattern with the selected value for the at least one holding pattern optimization parameter.

In some examples, the optimization module includes a holding pattern generator configured to generate a plurality of values for one or more holding pattern optimization parameters complying with at least one airspace holding pattern constraint.

In some examples, the apparatus includes an input module for receiving a manual input of the cost function condition and the at least one holding pattern optimization parameter.

In some examples, the electronic device implementing the example apparatus may be a mobile device in communication with a flight management system of the aircraft. The electronic device may be a device integrated on a flight deck of the aircraft and in communication with a flight management system.

In some examples, the apparatus may be integrated in a flight management system of the aircraft, the optimization module being configured to communicate the optimized holding pattern to a guidance and navigation controller of the flight management system to follow the selected optimized holding pattern.

In some examples, a flight management system includes:

An airspace constraints collector configured to obtain at least one airspace holding pattern constraint.

A real-time aircraft data collector configured to obtain real-time aircraft data including aircraft mass and flight performance data.

A weather data collector configured to obtain real-time or forecast atmospheric conditions including wind direction and wind speed proximate a holding pattern location.

A guidance and navigation controller configured to enable controlled flight of the aircraft following the selected optimized holding pattern.

According to a further aspect of the present invention there is provided a computer program product for establishing optimized holding patterns for aircraft, including instructions that, when executed by a machine, causes the machine to perform any of the example methods disclosed herein. The computer program product may include at least one computer-readable storage medium having recorded thereon the computer code instructions.

In some examples, the method dynamically generates holding patterns optimized for achieving an objective according to a cost function (e.g., minimizing or maximizing aircraft fuel consumption) by tailoring the location, altitude, orientation, shape and/or target speed of the pattern subject to the atmospheric conditions.

Example methods can be implemented as a software application on computing devices for air traffic control arrival planning support, or for mission planning (e.g., of military tanker operations). Example methods can also be incorporated on the flight deck in avionics systems or on mobile devices to assist flight crews with dynamically adjusting the holding pattern. The computing systems advise the pilots of changes in the holding patterns that they could accept and execute if the conducting flight operation authorizes the flight crew to tune the holding pattern on-the-fly.

Example methods can also be implemented in products made for air navigation service providers or in mission planning systems for military or commercial purposes for both manned and unmanned aerial systems. Example methods can be integrated as an additional capability in existing flight and mission planning products, as well as flight deck application suites. Example methods can also be implemented as part of software suites for arrival planning, mission planning, avionics systems or flight deck mobile devices.

Example methods provides benefits depending on the particular cost function. If the selected cost function tries to minimize fuel consumption, the method achieves not only fuel savings (e.g., from 1% to 5%, depending on the particular situation) but also an improved environmental footprint, reducing aircraft emissions of $CO_2$.

Figure 1:
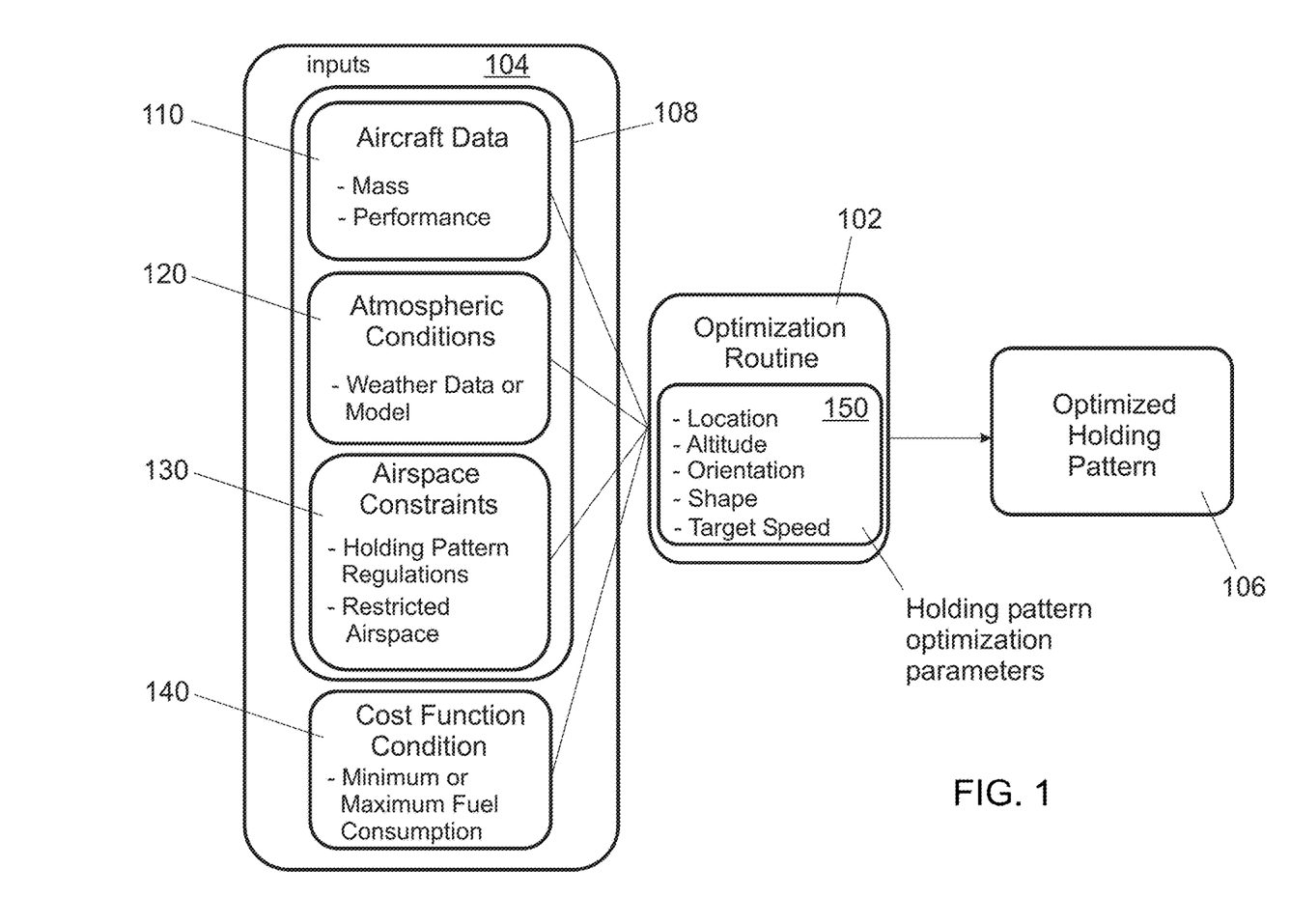
FIG. 1 illustrates an example process of an example optimization method used to generate an optimal holding pattern in accordance with the teachings of this disclosure.

FIG. 1 illustrates a process of an example method, which includes an optimization routine 102 that receives several inputs 104 to generate an optimized holding pattern 106. The inputs 104 include a plurality of optimization conditions 108 including at least one of the following:

Real-time aircraft data 110, including real-time aircraft mass and/or flight performance data. The aircraft data 110 can also include fuel consumption data such as real-time fuel consumption rate, fuel consumed, and fuel remaining data.

Local atmospheric conditions 120 in a region about a holding pattern location. These atmospheric conditions 120 can be either real-time or forecast weather data, preferably comprising wind direction and wind speed.

Airspace holding pattern constraints 130, which can be in the form of holding pattern regulations, air traffic control practices and/or restricted airspace specifications.

In the illustrated example of FIG. 1, the inputs 104 also include a cost function condition 140 adapted to a specific objective (e.g., minimum fuel consumption, maximum fuel consumption). Depending on the particular application, one or more (e.g., a subset) of the inputs 104 may be utilized. The optimization routine 102 optimizes one or more holding pattern parameters 150, such as the location, altitude, orientation, shape and/or target speed of the holding pattern to minimize the cost function. Depending on the particular application a selection of these optimization variables may be tailored.

In some examples, the optimization routine 102 may be implemented as an exhaustive search evaluating all combinations of the holding pattern parameters 150, a more advanced genetic algorithm, an artificial neural network and/or any other known optimization technique. The optimization routine 102 obtains the optimized holding pattern 106 with optimized holding pattern parameters complying with the input conditions 108.

The example method of FIG. 1 may be implemented as a software application on one or more computing devices for air traffic control decision support (arrival planning), for mission planning of military tanker and AWACS operations, and/or any other mission or flight planning requiring an aircraft to circle above a certain area of interest. The example method of FIG. 1 may also be integrated in the avionics software or on a mobile computing device to assist flight crews with adjusting the holding pattern on-the-fly, if authorized under the governing flight operations.

Figure 2:
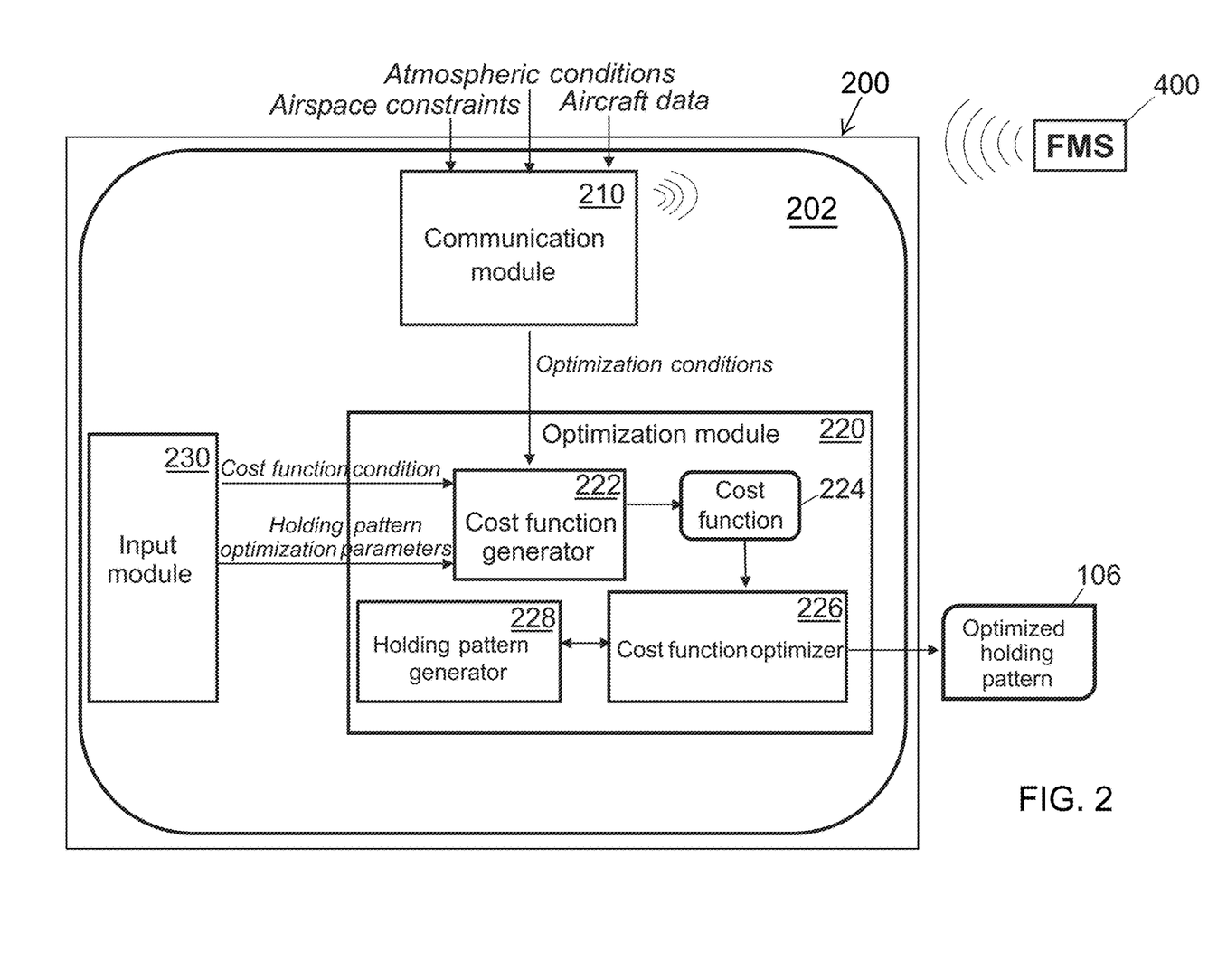
FIG. 2 is a block representation of an example optimization apparatus, implemented in an example mobile device, to implement the optimization method of FIG. 1 and constructed in accordance with the teachings of this disclosure.

FIG. 2 is a block diagram of an example optimization apparatus 202 that may implement the example method of FIG. 1. In the illustrated example of FIG. 2, the optimization apparatus 202 is implemented by an electronic device, such as a mobile device 200. The mobile device 200 may be, for example, an electronic flight bag, a laptop, a tablet computer and/or a handheld electronic device. In the illustrated example, the optimization apparatus 202 includes a communication module 210 that receives the optimization conditions 108, aircraft data and atmospheric conditions, and an optimization module 220 that receives the cost function condition 140 and at least one holding pattern optimization parameter 150 to be optimized.

In the illustrated example of FIG. 2, the optimization module 220 includes a cost function generator 222 to generate, using the cost function condition 140, a cost function 224 based on the holding pattern optimization parameters 150. An example cost function for minimizing fuel burn for a required holding time may be given by Equation 1 below:

$$f_c = \min \int_{t_0}^{t_0 + hold\ time} \frac{fuel\ burn_{1\ circuit}}{flight\ time_{1\ circuit}} dt \qquad \text{Equation 1}$$

In other examples, other costs functions may be used. In the illustrated example of FIG. 2, the optimization module 200 includes a cost function optimizer 226 that applies an optimization routine to the cost function 224 based on the received optimization conditions 108. In some examples, the optimization routine uses a trajectory prediction algorithm to calculate the fuel burn and flight time for each evaluated holding pattern configuration that feeds the data in the cost function 224. In some examples, the optimization routine is an exhaustive search evaluating all possible combinations of the optimization conditions 108 to determine the configuration with the lowest cost. Additionally or alternatively, more advanced search routines may be applied to find the minimum cost solution in a more efficient way. The values for the holding pattern optimization parameters with a minimized cost are selected. As a result, an optimized holding pattern 106 with the selected values of the holding pattern optimization parameters 150 is obtained.

In some examples, the optimization module 220 includes a holding pattern generator 228 that generates different values for the holding pattern optimization parameters 150 that comply with the airspace holding pattern constraints 130, these values being analyzed by the cost function optimizer 226.

In some examples, the optimization apparatus 202 includes an input module 230 through which a user can manually input the cost function condition 140 and/or the holding pattern optimization parameters 150.

The communication module 210 may be a wireless communication unit in charge of wirelessly communicating with an example flight management system (FMS) 400 of an aircraft, for example. In this manner, the optimization conditions 108 can be transmitted directly from the FMS 400 to the mobile device 200. Additionally or alternatively, the mobile device 200 may obtain the optimization conditions 108 by accessing other devices or computer systems. For example, the atmospheric conditions 120 may be wirelessly retrieved from a weather forecast service. The wireless communication module 210 may also be used to communicate the selected optimized holding pattern 106 to the FMS 400. Additionally or alternatively, the mobile device 200 may communicate the optimized holding pattern 106 to a user (e.g., the aircraft pilots) using a visual message shown on the display of the mobile device 200 or via acoustic messages. The user can manually insert the holding pattern parameters into the FMS 400, if no automatic communication from the mobile device 200 to the FMS 400 is available.

Figure 3:
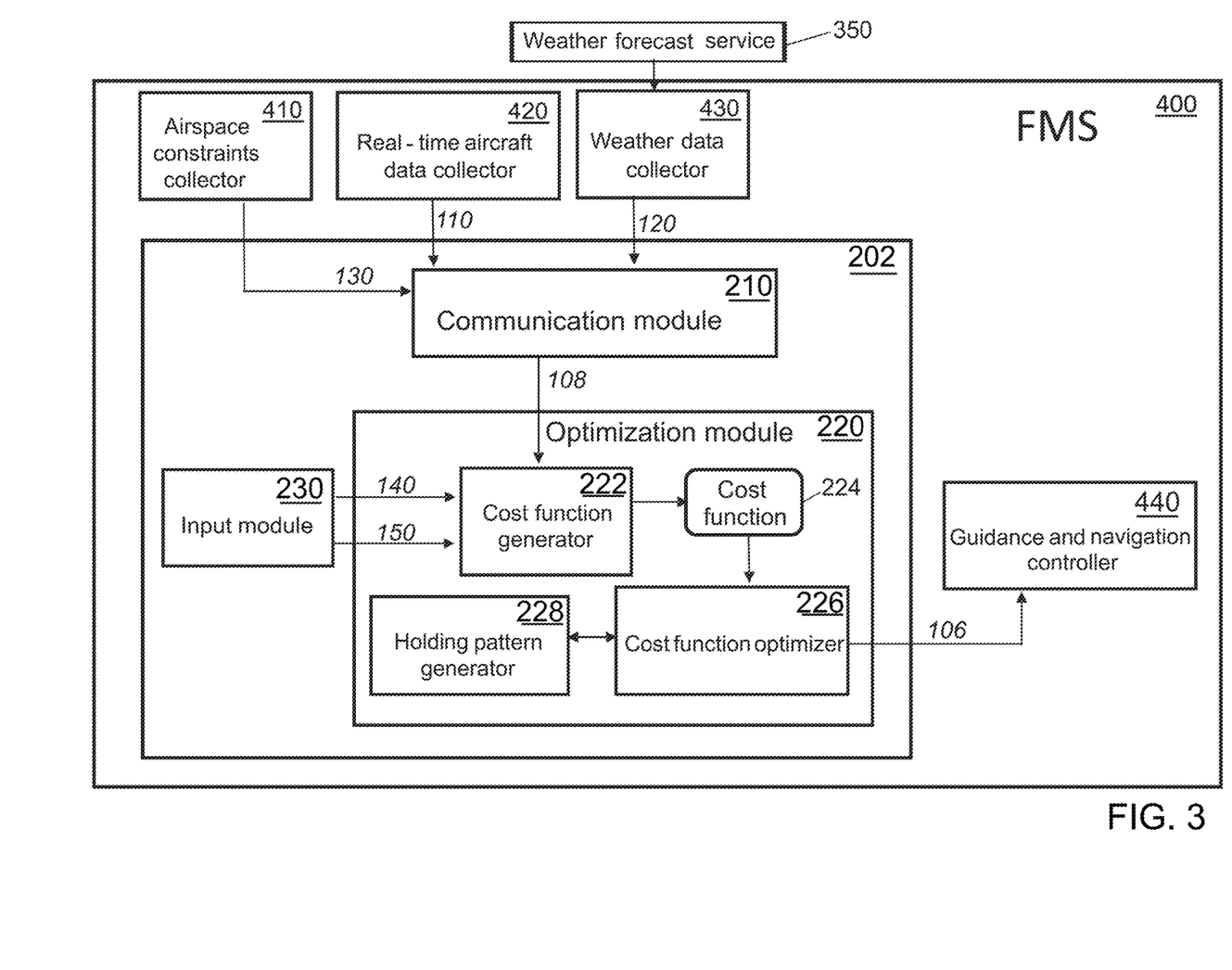
FIG. 3 is a block representation of the example optimization apparatus of FIG. 2 implemented within an example flight management system.

FIG. 3 is a block diagram of the example optimization apparatus 202 as implemented in an example FMS, such as the FMS 400 of the aircraft. In the illustrated example, the FMS 400 includes an airspace constraints collector 410 that obtains airspace holding pattern constraints 130, a real-time aircraft data collector 420 that computes and obtains real-time aircraft data 110, and a weather data collector 430 that obtains real-time or forecast atmospheric conditions 120 about a holding pattern location. The FMS 400 collects data from various sources, such as aircraft data buses, internal databases and potentially external services (e.g., services supplying weather forecast data). In some example, the FMS 400 calculates some of this data.

In the illustrated example, the optimization module 220 sends the optimized holding pattern 106 to a guidance and navigation controller 440 of the FMS 400 that is configured to enable controlled flight of the aircraft following the selected optimized holding pattern 106.

In some examples, where the cost function condition 140 is set to minimize fuel consumption, the optimization of holding patterns results in significant fuel savings.

Figure 4:
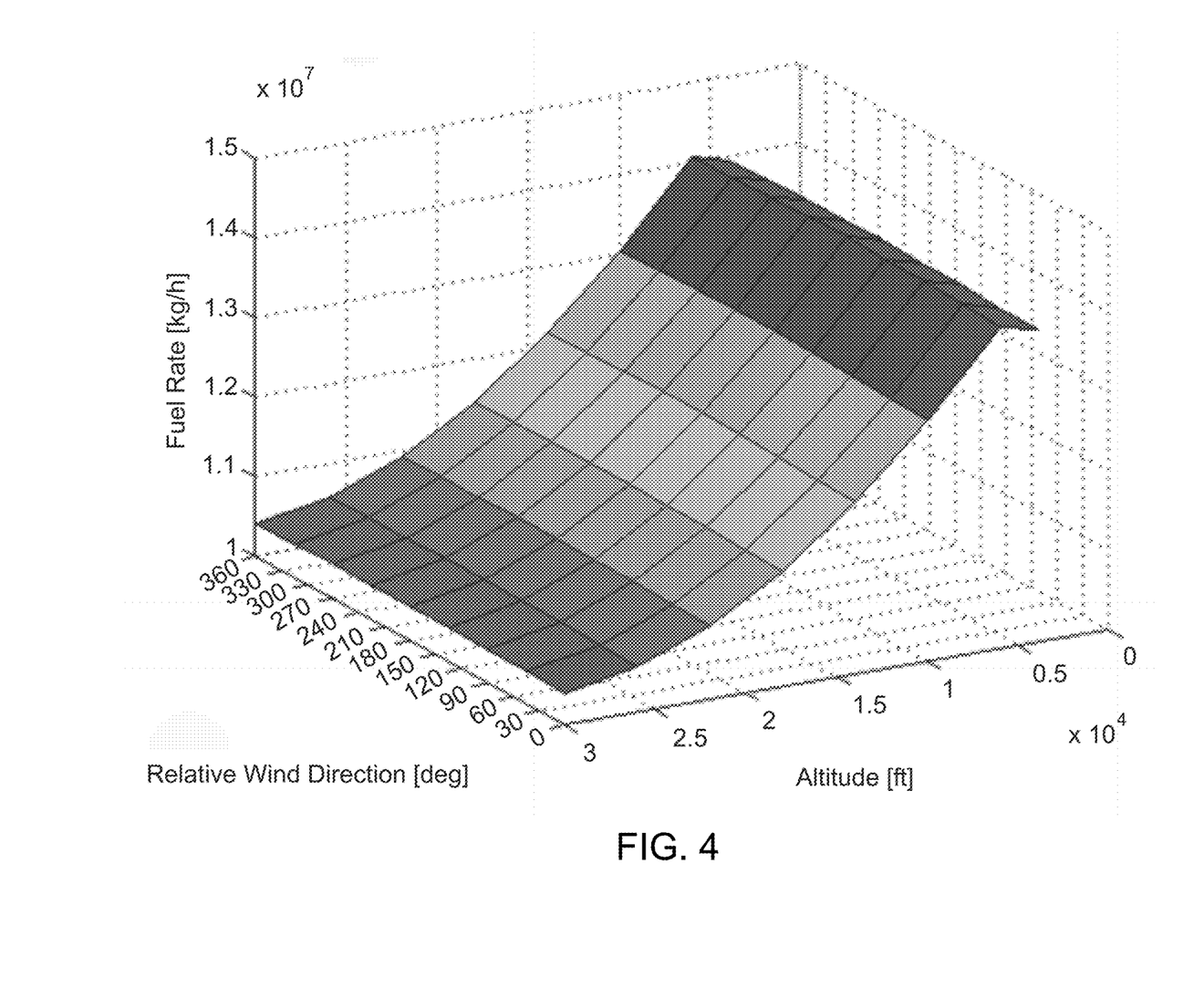
FIG. 4 depicts a three-dimensional (3D) graph showing the effect of altitude and orientation of a holding pattern on fuel burn, for a constant wind of 80 knots (kn).

FIG. 4 depicts a plot of fuel burn as a function of holding pattern altitude and wind direction relative to the inbound leg of the holding pattern (and considering a constant wind of 80 kn). As illustrated in FIG. 4, a higher altitude is more fuel efficient, offering up to 2% fuel burn reduction per 1,000 feet (ft). In addition, the orientation of the holding pattern with respect to the wind direction can result in up to an additional 0.5% fuel burn reduction.

Figure 5:
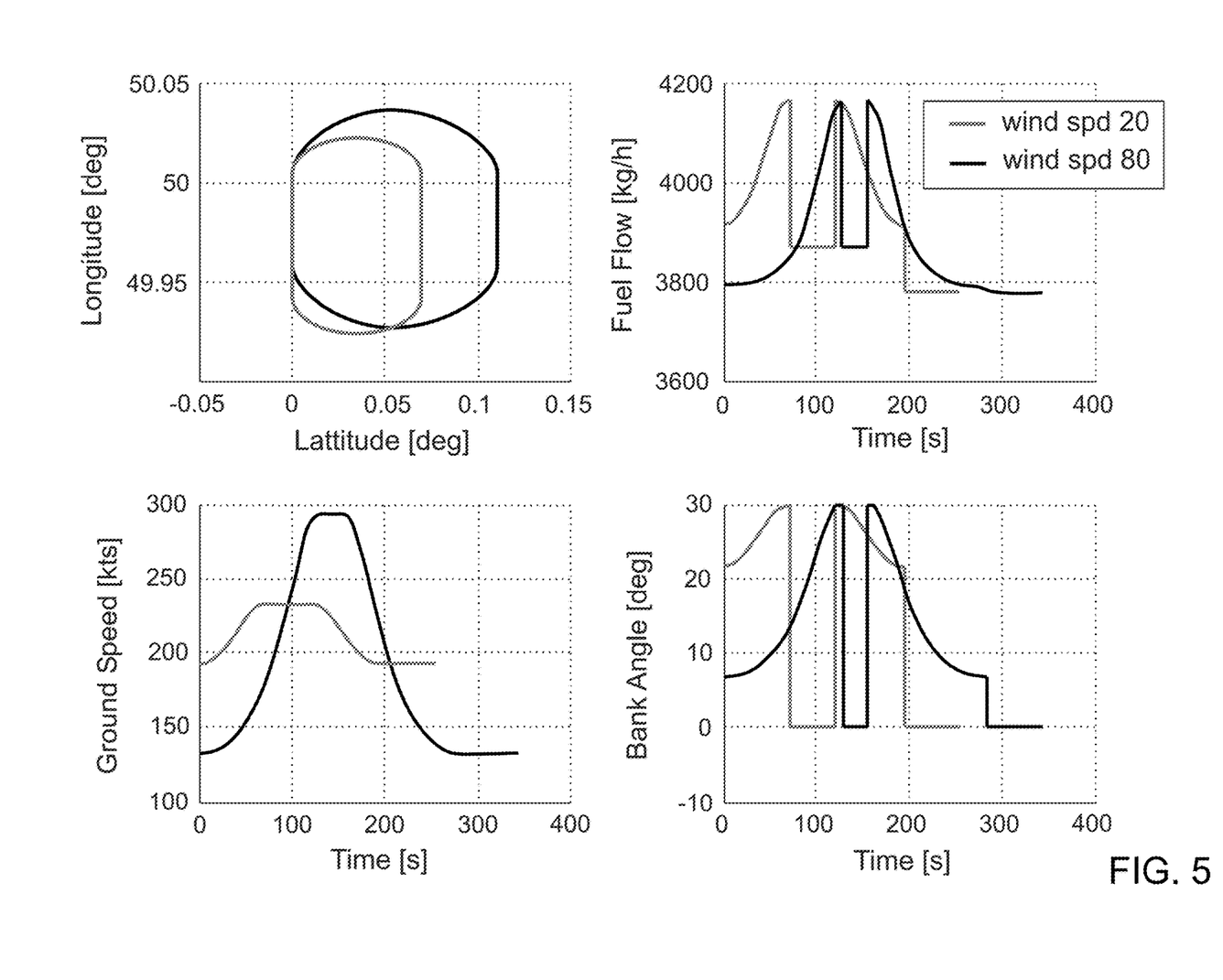
FIG. 5 depicts the effect of wind speed on various holding pattern parameters.

FIG. 5 represents, in four graphs, the effect of wind speed on various holding pattern parameters optimized with the optimization routine 102, considering a constant altitude of 4,000 ft. Two different atmospheric conditions 130 are considered by the optimization routine 102: wind speed of 20 kn for a first condition and wind speed of 80 kn for a second condition.

As shown in the upper-left graph of FIG. 5, wind strength has an important influence on the optimized holding pattern shape and, thus, on aircraft fuel consumption (upper-right graph). Increasing the leg length of the holding pattern makes the holding pattern more fuel efficient, because the relative portion of the more inefficient turns reduces. A smaller maximum bank angle (e.g., roll angle), shown in the lower-right graph, decreases fuel burn due to the reduction in the steepness of the turns. A lower holding speed is more fuel efficient, providing up to 2% fuel burn reduction per 10 kn calibrated airspeed (CAS).

Figure 6:
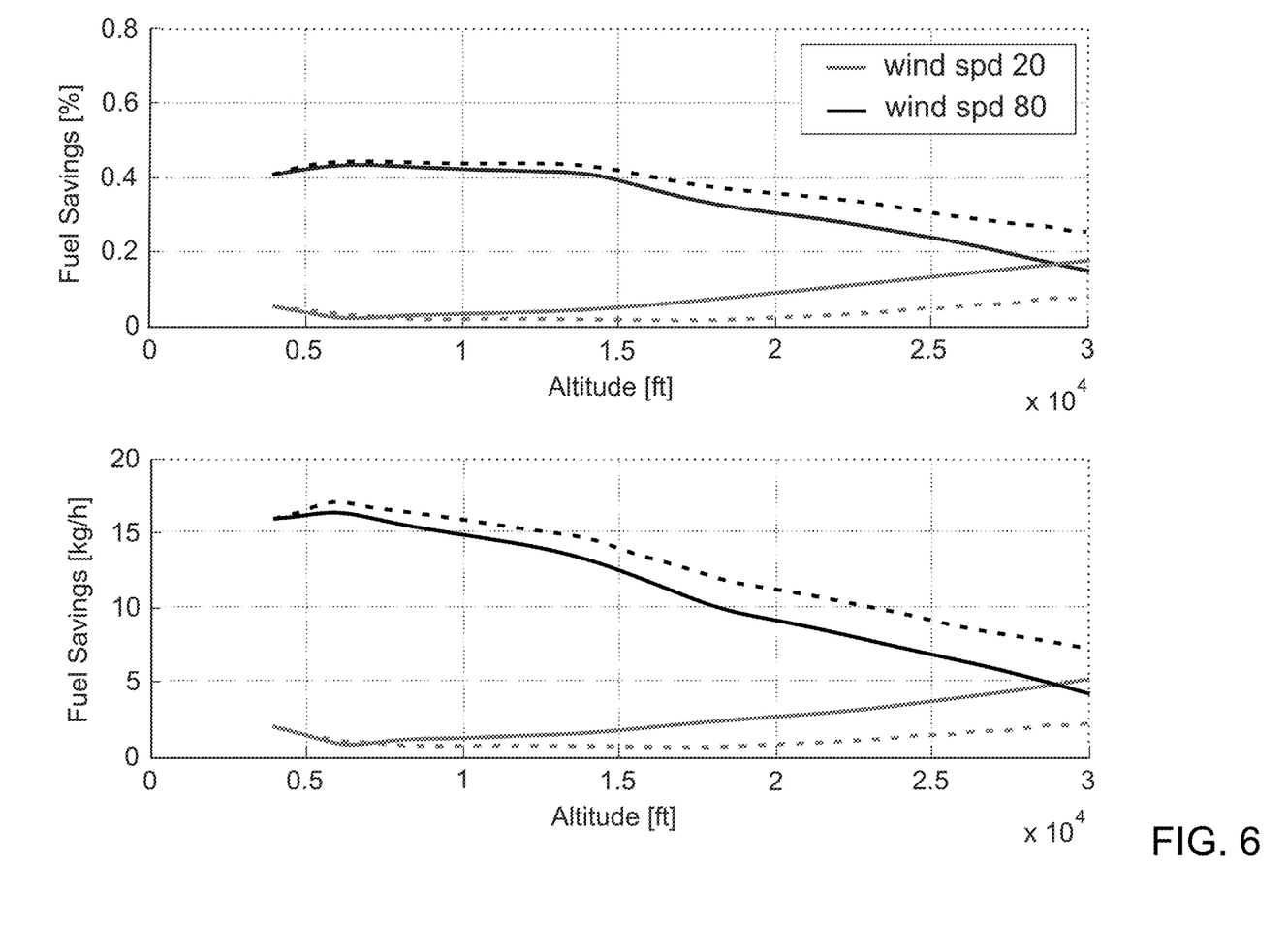
FIG. 6 represents, for two different wind speeds and two different airspeeds, fuel burn savings achievable by optimizing the holding pattern orientation with respect to the wind at various altitudes.

FIG. 6 shows the relation between the fuel burn savings as result of optimizing holding pattern orientation (in relative terms in the upper graph and in absolute terms in the lower graph) and the altitude of the holding pattern for two different wind speeds, 20 kn and 80 kn, and two different airspeeds, 210 kn (solid line) and 230 kn (dashed line). For an average long haul aircraft in a holding pattern, a 1% fuel burn reduction is about 36 kilograms per hour (kg/h), and for a short haul aircraft the fuel burn reduction is about 11 kg/h. Locating a holding pattern at and altitude with stronger winds can reduce the fuel burn up to 0.5% per 10 kn of wind speed.

While an example manner of implementing the optimization apparatus 202 is illustrated in FIGS. 2 and 3, one or more of the elements, processes and/or devices illustrated in FIGS. 2 and 3 may be combined, divided, re-arranged, omitted, eliminated and/or implemented in any other way. Further, the example communication module 210, the example optimization module 220, the example cost function generator 222, the example cost function optimizer 226, the example holding pattern generator 228, the example input module 230, more generally, the example optimization apparatus 202 of FIGS. 2 and 3 may be implemented by hardware, software, firmware and/or any combination of hardware, software and/or firmware. Thus, for example, any of the example communication module 210, the example optimization module 220, the example cost function generator 222, the example cost function optimizer 226, the example holding pattern generator 228, the example input module 230, more generally, the example optimization apparatus 202 of FIGS. 2 and 3 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example communication module 210, the example optimization module 220, the example cost function generator 222, the example cost function optimizer 226, the example holding pattern generator 228, the example input module 230, more generally, the example optimization apparatus 202 of FIGS. 2 and 3 is/are hereby expressly defined to include a tangible computer readable storage device or storage disk such as a memory, a digital versatile disk (DVD), a compact disk (CD), a Blu-ray disk, etc. storing the software and/or firmware. Further still, the example optimization apparatus 202 of FIGS. 2 and 3 may include one or more elements, processes and/or devices in addition to, or instead of, those illustrated in FIGS. 2 and 3, and/or may include more than one of any or all of the illustrated elements, processes and devices.

The example method of FIG. 1 may be implemented by the optimization apparatus 202 (e.g., implemented as the mobile device 200 of FIG. 2 or the FMS 400 of FIG. 3). In this example, the method may be implemented, at least in part, by machine readable instructions that comprise a program for execution by a processor such as the processor 712 shown in the example processor platform 700 discussed below in connection with FIG. 7. The program may be embodied in software stored on a tangible computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example program is described with reference to the method disclosed in connection with FIG. 1, many other methods of implementing the example optimization apparatus 202 may alternatively be used. For example, the order of execution of the blocks may be changed, and/or some of the blocks described may be changed, eliminated, or combined.

As mentioned above, the example process of FIG. 1 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example process of FIG. 1 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 7:
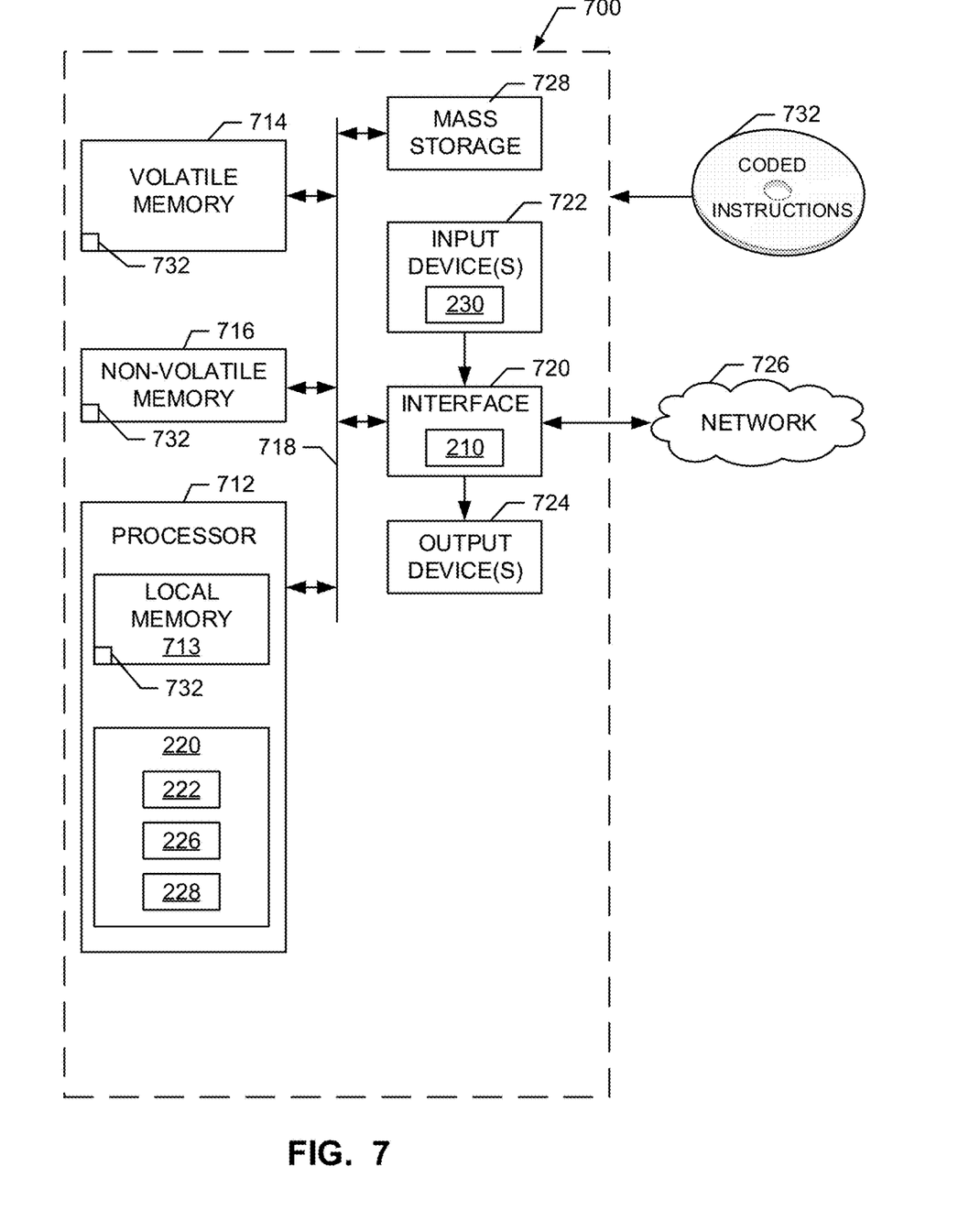
FIG. 7 is a processor platform that may execute instructions to implement the example method of FIG. 1 and the example apparatus of FIGS. 2 and 3.

FIG. 7 is a block diagram of an example processor platform 700 capable of executing instructions (e.g., representing the example method of FIG. 1) to implement the optimization apparatus 202 of FIGS. 2 and 3. The processor platform 700 can be, for example, a server, a personal computer, a mobile device (e.g., a cell phone, a smart phone, a tablet such as an iPad™), a personal digital assistant (PDA), or any other type of computing device, such as a computing device in a flight management system.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer. In this example, the processor 712 may include the example cost function generator 222, the example cost function optimizer 226, the example holding pattern generator 228 and/or, more generally, the example optimization module 220.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a PCI express interface. In this example, the interface circuit 720 may include the example communication module 210.

In the illustrated example, one or more input devices 722 are connected to the interface circuit 720. The input device(s) 722 permit(s) a user to enter data and commands into the processor 712. The input device(s) 722 can be implemented by, for example, an audio sensor, a microphone, a camera (still or video), a keyboard, a button, a mouse, a touchscreen, a track-pad, a trackball, isopoint and/or a voice recognition system. In this example, the input device(s) 722 may include the example input module 230. In some examples, such as in the example illustrated in FIG. 3, the input device(s) 722 may also include the example airspace constraints collector 410, the example real-time aircraft data collector 420 and/or the example weather data collector 430.

One or more output devices 724 are also connected to the interface circuit 720 of the illustrated example. The output device(s) 724 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 720 of the illustrated example, thus, typically includes a graphics driver card, a graphics driver chip or a graphics driver processor. In some examples, such as in the example illustrated in FIG. 3, the output device(s) 724 may include the example guidance and navigation controller 440.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives.

Coded instructions 732 (such as the example method disclosed in connection with FIG. 1) may be stored in the mass storage device 728, in the volatile memory 714, in the non-volatile memory 716, and/or on a removable tangible computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
   receiving a plurality of optimization conditions including aircraft data associated with an aircraft and at least one of real-time and forecast atmospheric conditions proximate a holding pattern location;
   receiving a cost function condition, the cost function condition including minimizing fuel consumption to improve fuel efficiency;
   receiving at least one holding pattern optimization parameter;

generating, by executing an instruction with a processor, based on the cost function condition, a cost function with the at least one holding pattern optimization parameter;

applying, by executing an instruction with the processor, an optimization routine to the cost function based on the optimization conditions to determine a value for the at least one holding pattern optimization parameter having a minimized cost; and obtaining, by executing an instruction with the processor, an optimized holding pattern with the determined value for the at least one holding pattern optimization parameter.

2. The method of claim 1, further including transmitting, by executing an instruction with the processor, the optimized holding pattern to a flight management system of the aircraft to enable controlled flight of the aircraft following the obtained optimized holding pattern.

3. The method of claim 1, wherein the optimization conditions include at least one airspace holding pattern constraint.

4. The method of claim 1, wherein the aircraft data includes real-time aircraft mass and flight performance data.

5. The method of claim 1, wherein the at least one holding pattern optimization parameter includes at least one of:
 a location of a holding pattern;
 an altitude of a holding pattern;
 an orientation of a holding pattern;
 a shape of a holding pattern; or
 a target speed for a holding pattern.

6. The method of claim 1, wherein applying the optimization routine includes using a trajectory prediction algorithm to calculate fuel burn and flight time for a plurality of configurations of the holding pattern optimization parameter.

7. An apparatus comprising:
 a communication module to receive a plurality of optimization conditions, the optimization conditions including aircraft data associated with an aircraft and at least one of real-time and forecast atmospheric conditions proximate a holding pattern location; and
 an optimization module to receive a cost function condition and at least one holding pattern optimization parameter, the cost function condition including minimizing fuel consumption to improve fuel efficiency, the optimization module including:
  a cost function generator to generate, based on the cost function condition, a cost function with the at least one holding pattern optimization parameter; and
  a cost function optimizer to:
   apply an optimization routine to the cost function based on the optimization conditions to determine a value for the at least one holding pattern optimization parameter having a minimized cost; and
   obtain an optimized holding pattern with the determined value for the at least one holding pattern optimization parameter.

8. The apparatus of claim 7, wherein the optimization module further includes a holding pattern generator to generate a plurality of values for one or more holding pattern optimization parameters complying with at least one airspace holding pattern constraint.

9. The apparatus of claim 7, further including an input module to receive a manual input of the cost function condition and the at least one holding pattern optimization parameter.

10. The apparatus of claim 7, wherein the communication module and the optimization module are included in a mobile device in communication with a flight management system of the aircraft.

11. The apparatus of claim 7, wherein the at least one holding pattern optimization parameter includes at least one of:
 a location of a holding pattern;
 an altitude of a holding pattern;
 an orientation of a holding pattern;
 a shape of a holding pattern; or
 a target speed for a holding pattern.

12. The apparatus of claim 7, wherein the communication module and the optimization module are included in a flight deck of the aircraft and in communication with a flight management system.

13. The apparatus of claim 7, wherein the communication module and the optimization module are integrated in a flight management system of the aircraft, the optimization module is to communicate the optimized holding pattern to a guidance and navigation controller of the flight management system to follow the optimized holding pattern.

14. The apparatus of claim 13, wherein the flight management system includes:
 an airspace constraints collector to obtain at least one airspace holding pattern constraint;
 a real-time aircraft data collector to obtain real-time aircraft data including aircraft mass and flight performance data;
 a weather data collector to obtain real-time or forecast atmospheric conditions including wind direction and wind speed proximate a holding pattern location; and
 the guidance and navigation controller to enable controlled flight of the aircraft in accordance with optimized holding pattern.

15. The apparatus of claim 8, wherein the at least one airspace holding pattern constraint includes at least one of a holding pattern regulation, an air traffic control practice, or a restricted airspace specification.

16. A tangible machine readable storage medium comprising instructions that, when executed, cause a machine to at least:
 receive a plurality of optimization conditions including aircraft data associated with an aircraft and at least one of real-time and forecast atmospheric conditions proximate a holding pattern location;
 receive a cost function condition, the cost function condition including minimizing fuel consumption to improve fuel efficiency;
 receive at least one holding pattern optimization parameter;
 generate, based on the cost function condition, a cost function with the at least one holding pattern optimization parameter;
 apply an optimization routine to the cost function based on the optimization conditions to determine a value for the at least one holding pattern optimization parameter having a minimized cost; and
 obtain an optimized holding pattern with the determined value for the at least one holding pattern optimization parameter.

17. The tangible machine readable storage medium of claim 16, wherein the instructions, when executed, further cause the machine to transmit the optimized holding pattern to a flight management system of the aircraft to enable controlled flight of the aircraft following the optimized holding pattern.

18. The tangible machine readable storage medium of claim 16, wherein the optimization conditions include at least one airspace holding pattern constraint.

19. The tangible machine readable storage medium of claim 16, wherein the aircraft data includes real-time aircraft mass and flight performance data.

20. The tangible machine readable storage medium of claim 16, wherein the at least one holding pattern optimization parameter includes at least one of:
- a location of a holding pattern;
- an altitude of a holding pattern;
- an orientation of a holding pattern;
- a shape of a holding pattern; or
- a target speed for a holding pattern.

* * * * *